United States Patent
Ishihara et al.

(10) Patent No.: US 9,671,763 B2
(45) Date of Patent: Jun. 6, 2017

(54) DEVICE FOR CONTROLLING CONSTRUCTION MACHINERY

(71) Applicant: HITACHI CONSTRUCTION MACHINERY CO., LTD., Tokyo (JP)

(72) Inventors: Shinji Ishihara, Tokyo (JP); Masatoshi Hoshino, Tokyo (JP); Mitsuo Sonoda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 388 days.

(21) Appl. No.: 14/370,127

(22) PCT Filed: Dec. 28, 2012

(86) PCT No.: PCT/JP2012/084030
§ 371 (c)(1),
(2) Date: Jul. 1, 2014

(87) PCT Pub. No.: WO2013/103133
PCT Pub. Date: Jul. 11, 2013

(65) Prior Publication Data
US 2014/0371915 A1    Dec. 18, 2014

(30) Foreign Application Priority Data

Jan. 5, 2012  (JP) .................. 2012-000847

(51) Int. Cl.
G05B 11/01 (2006.01)
B60K 6/485 (2007.10)
(Continued)

(52) U.S. Cl.
CPC .............. *G05B 11/01* (2013.01); *B60K 6/485* (2013.01); *B60W 10/06* (2013.01); *B60W 10/30* (2013.01);
(Continued)

(58) Field of Classification Search
None
See application file for complete search history.

(56) References Cited

U.S. PATENT DOCUMENTS

| | | | | |
|---|---|---|---|---|
| 5,307,631 | A | * | 5/1994 | Tatsumi ................ E02F 9/2228 60/452 |
| 2001/0001278 | A1 | * | 5/2001 | Drevet ................ F04B 43/0018 417/222.2 |

(Continued)

FOREIGN PATENT DOCUMENTS

| | | |
|---|---|---|
| JP | 11-002144 A | 1/1999 |
| JP | 2000-45812 A | 2/2000 |

(Continued)

OTHER PUBLICATIONS

Japanese Office Action received in corresponding Japanese Application No. 2013-552426 dated Aug. 25, 2015.

(Continued)

*Primary Examiner* — Tuan Dao
(74) *Attorney, Agent, or Firm* — Mattingly & Malur, PC

(57) ABSTRACT

In a control device for construction machinery, a system operating point calculation unit calculates a plurality of combinations of engine rotational speed and engine torque with which demanded power of an engine can be generated; and calculates system efficiency in each of the combinations according to discharge pressure of a hydraulic. A rotational speed calculation unit calculates target rotational speed of the engine as the engine rotational speed in one of the combinations of the engine rotational speed, the engine torque and the system efficiency calculated by the system operating point calculation unit that includes desired system efficiency. A displacement calculation unit calculates target displacement of the hydraulic pump based on the target rotational speed calculated by the rotational speed calculation unit and demanded flow rate of the hydraulic pump. With this control device, the engine and the hydraulic pump can be controlled at an efficient operating point.

7 Claims, 13 Drawing Sheets

(51) Int. Cl.
*B60W 10/06* (2006.01)
*B60W 20/00* (2016.01)
*F04B 49/06* (2006.01)
*B60W 10/30* (2006.01)
*B60W 30/188* (2012.01)
*G05B 15/02* (2006.01)
*F02D 29/04* (2006.01)
*F02D 29/06* (2006.01)

(52) U.S. Cl.
CPC ........ *B60W 20/00* (2013.01); *B60W 30/1882* (2013.01); *F04B 49/06* (2013.01); *G05B 15/02* (2013.01); *F02D 29/04* (2013.01); *F02D 29/06* (2013.01); *Y02T 10/6226* (2013.01)

(56) References Cited

U.S. PATENT DOCUMENTS

| | | | |
|---|---|---|---|
| 2003/0061004 A1* | 3/2003 | Discenzo | G05B 13/024 702/182 |
| 2004/0088103 A1* | 5/2004 | Itow | B60K 6/485 701/110 |
| 2009/0143952 A1* | 6/2009 | Chisholm | B60W 10/30 701/99 |
| 2009/0204234 A1* | 8/2009 | Sustaeta | G05B 13/024 700/29 |
| 2011/0126533 A1* | 6/2011 | Noll | B60W 10/06 60/431 |

FOREIGN PATENT DOCUMENTS

| | | |
|---|---|---|
| JP | 2004-084470 A | 3/2004 |
| JP | 2004-150304 A | 5/2004 |
| JP | 2009-074405 A | 4/2009 |
| WO | 98/06936 A1 | 2/1998 |
| WO | 2010/082636 A1 | 7/2010 |

OTHER PUBLICATIONS

International Preliminary Report on Patentability received in International Application No. PCT/JP2012/084030 dated Jul. 17, 2014.

* cited by examiner

_US 9,671,763 B2_

DEVICE FOR CONTROLLING CONSTRUCTION MACHINERY

TECHNICAL FIELD

The present invention relates to a control device for construction machinery equipped with an engine and a hydraulic pump mechanically connected to the engine.

BACKGROUND ART

Conventional construction machinery (hydraulic excavator, wheel loader, etc.) comprising a hydraulic system for driving hydraulic actuators is generally equipped with a large engine selected in anticipation of maximum-load operations so that the construction machinery can deal with all types of operations from light-load operations to heavy-load operations. However, heavy-load operations are only a part of all the operations performed by construction machinery and such high engine performance can be too much or hard to handle when the load is light or medium. Thus, such a large engine is undesirable from the viewpoint of fuel efficiency.

Meanwhile, there exists a technology for reducing the fuel consumption (JP-11-2144-A). This technology reduces the fuel consumption by downsizing the engine to increase the fuel efficiency, constructing a hybrid system including a motor generator for compensating for the drop in the engine output caused by the downsizing of the engine, and operating the hybrid system at a high efficiency point by performing variable control on the rotational speed of the engine through the output assistance by the motor generator having quick output response.

In construction machinery comprising a hydraulic system, it is important to improve "workload fuel efficiency" (index representing how much the hydraulic actuators can work relative to the amount of supplied fuel). In order to improve the workload fuel efficiency, just operating the engine at its high efficiency point is insufficient; both the engine and the hydraulic pump have to be operated at operating points where excellent efficiency of the entire construction machinery is achieved.

A technology designed to resolve such a problem has been proposed in Patent Literature 2. In the technology described in JP-2009-74405-A, a target flow rate of the hydraulic pump is calculated by a target flow rate calculation unit based on the operator's lever operation for operating the hydraulic actuators. A target rotational speed of the engine (first target rotational speed) calculated according to the target flow rate of the hydraulic pump is compared with a target rotational speed calculated from the load pressure of the hydraulic pump and the lever inputs (fourth target rotational speed). The pump efficiency and the engine efficiency at times of high loads are enhanced by setting the final target rotational speed at the lower one selected from the first and fourth target rotational speeds.

In JP-2004-84470-A, the engine and the hydraulic pump are operated respectively at their high efficiency operating points by arranging a CVT (Continuously Variable Transmission) between the engine and the hydraulic pump.

PRIOR ART LITERATURE

Patent Literature

Patent Literature 1: JP-11-2144-A
Patent Literature 2: JP-2009-74405-A
Patent Literature 3: JP-2004-84470-A

SUMMARY OF THE INVENTION

Problem to be Solved by the Invention

In the technology of JP-2004-84470-A, a CVT has to be arranged between the engine and the motor generator and between the engine and the hydraulic pump. This naturally leads to complication of the power train (power drive train). Further, an increase in the total capacity of the power train is inevitable and the construction machinery is necessitated to be large-sized as a whole. Furthermore, the mechanical loss increases due to the arrangement of the CVTs between the power train elements. Consequently, there arises a possibility of a drop in the efficiency of the entire system.

In the technology of JP-2009-74405-A, the efficiency improvement of the hydraulic pump is made by securing a large pump displacement of the variable displacement hydraulic pump and then the target rotational speed is set at an operating point where the engine efficiency becomes high. However, the pump efficiency is not uniquely determined by the pump displacement. FIG. 19 shows the change in the pump efficiency with respect to the rotational speed in a case where the pump displacement is kept constant. As is clear from FIG. 19, with the increase in the rotational speed of the pump, the mechanical efficiency decreases due to an accompanying increase in friction, etc., and consequently, the total efficiency of the pump (product of the mechanical efficiency and the volumetric efficiency) drops. The technology of JP-2009-74405-A, not considered such a drop in the total efficiency of the hydraulic pump accompanying the increase in the rotational speed, is equivalent to just setting the high efficiency point of the engine alone under the condition that the pump target rotational speed and sufficient outflow quantity can be secured when the hydraulic pump is operated at its maximum displacement. Further, in cases where the engine is greatly downsized so as to reduce the fuel consumption, the need of securing a certain output level can make it necessary to control the engine at higher rotational speeds compared to the conventional engine as shown in FIG. 19. This leads to the aforementioned drop in the pump efficiency.

It is therefore the primary object of the present invention to provide a control device for construction machinery capable of controlling the engine and the hydraulic pump at high efficiency operating points with a simple configuration.

Means for Solving the Problem

To achieve the above object, the present invention provides a control device for construction machinery equipped with an engine and a variable displacement hydraulic pump driven by the engine, comprising: a first operating point calculation unit which calculates a plurality of combinations of engine rotational speed and engine torque with which demanded power of the engine can be generated and calculates system efficiency, as the product of energy efficiency of the engine and energy efficiency of the hydraulic pump, in each of the combinations according to discharge pressure of the hydraulic pump; a rotational speed calculation unit which calculates target rotational speed of the engine as the engine rotational speed in one of the combinations of the engine rotational speed, the engine torque and the system efficiency calculated by the first operating point calculation unit that includes desired system efficiency; and a displacement calculation unit which calculates target displacement of the hydraulic pump based on the target rotational speed calculated by the rotational speed calculation unit and demanded flow rate of the hydraulic pump.

Effect of the Invention

According to the present invention, the engine and the hydraulic pump can be controlled with a simple configuration at operating points where the efficiency of the entire system is excellent.

MODE FOR CARRYING OUT THE INVENTION

Figure 1:
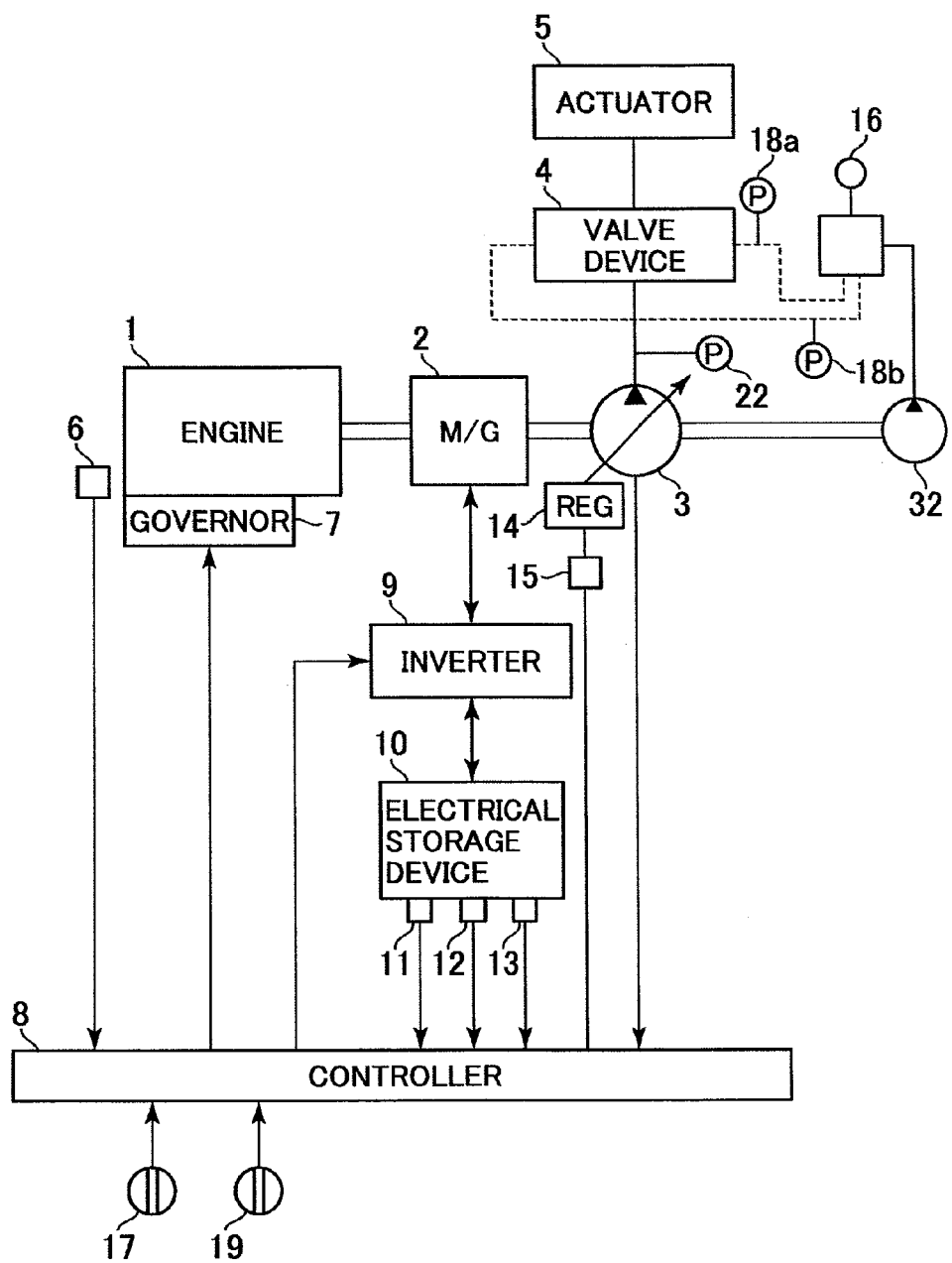
FIG. 1 is a schematic block diagram showing the overall configuration of a hydraulic drive control system of a hybrid hydraulic excavator in accordance with a first embodiment of the present invention.

Referring now to the drawings, a description will be given in detail of preferred embodiments of the present invention.

FIG. 1 is a schematic block diagram showing the overall configuration of a hydraulic drive control system of a hybrid hydraulic excavator in accordance with a first embodiment of the present invention. The hydraulic drive control system shown in FIG. 1 comprises: an engine 1; a governor 7 which adjusts the fuel injection quantity of the engine 1; a rotational speed sensor (actual rotational speed detection means) 6 which detects the actual rotational speed of the engine 1; a variable displacement hydraulic pump 3 (hereinafter referred to simply as a "hydraulic pump 3" as needed) which is mechanically connected to the engine 1 and is driven by the engine 1; hydraulic actuators 5 which are driven by hydraulic oil discharged from the variable displacement hydraulic pump 3; a pilot pump 32 which is driven by the engine 1; operating levers (operating devices) 16 for controlling the hydraulic actuators 5 by reducing the pressure of hydraulic oil discharged from the pilot pump 32 and outputting the decompressed hydraulic oil to a valve device 4; a motor generator 2 which is arranged on the drive shaft of the engine 1 and assists the driving of the hydraulic pump 3 by the engine 1 or generates electric power by being driven by the engine 1; an electrical storage device (electrical storage means) 10 for storing electric power for driving the motor generator 2; a regulator 14 which is included in a pump displacement adjustment device (pump displacement adjustment means) for adjusting the displacement of the hydraulic pump 3; an inverter (power conversion device) 9 which controls the motor generator 2 while also controlling the transfer of the electric power between the motor generator 2 and the electrical storage device 10; a controller (control device) 8 which controls the engine rotational speed by adjusting the fuel injection quantity by controlling the governor 7 while also controlling the torque of the motor generator 2 by controlling the inverter 9; an engine control dial (engine rotational speed specifying device) 17 for designating the target rotational speed of the engine 1; and an operation mode selector switch (operation mode switching device) 19 for switching the operation mode (power mode prioritizing workability over fuel efficiency, energy saving mode prioritizing fuel efficiency over workability, etc.) of the hydraulic excavator.

The hydraulic drive control system shown in FIG. 1 controls the driving of each hydraulic actuator 5 by first supplying the hydraulic oil discharged by the hydraulic pump 3 to the valve device 4 (including a plurality of control valves) and then supplying the hydraulic oil to each hydraulic actuator 5 after having the valve device 4 properly change the flow rate, direction and/or pressure of the hydraulic oil. Each control valve in the valve device 4 is controlled by hydraulic oil which has been discharged from the pilot pump 32 and decompressed according to the operation amount of a corresponding operating lever 16. The operation amount of each operating lever 16 can be measured by detecting the pressure of the hydraulic oil outputted from the pilot pump 32 to the valve device 4 (control valve) by use of pressure detection means such as pressure sensors 18a and 18b (see FIG. 1). The hydraulic actuators 5 installed in the hydraulic excavator of this embodiment include hydraulic cylinders (boom cylinder, arm cylinder, bucket cylinder, etc.) for driving a multijoint front work implement which is attached to the front of an upper swing structure of the hydraulic excavator, a hydraulic motor (swing motor) for swinging (rotating) the upper swing structure, hydraulic motors (travel motors) for the traveling of a lower track structure arranged under the upper swing structure, and so forth. These hydraulic actuators are collectively expressed as the "HYDRAULIC ACTUATOR 5" in FIG. 1.

The speed control of the engine 1 is carried out through the control of the fuel injection quantity by the governor 7. The hydraulic pump 3 is equipped with means for detecting information necessary for calculating the load on the hydraulic pump 3 (pump information detection means 21). The pump information detection means 21 includes a pressure sensor 22 (pressure detection means) for measuring the pressure of the hydraulic oil discharged from the hydraulic pump 3, a flow rate sensor (flow rate detection means) for measuring the flow rate of the hydraulic oil, and an angle sensor (angle detection means) for measuring the tilting angle of the hydraulic pump 3. The pressure sensor 22, the flow rate sensor and the angle sensor output the detected values (sensor values) to the controller 8.

The regulator 14 and an electromagnetic proportional valve 15 constitute a pump displacement adjustment device for adjusting the displacement of the hydraulic pump 3 according to an operation signal outputted from the controller 8. The regulator 14 is provided for the hydraulic pump 3. When the tilting angle of the swash plate/shaft of the hydraulic pump 3 is manipulated by the regulator 14, the displacement (displacement volume) of the hydraulic pump 3 is changed, by which the absorption torque (input torque) of the hydraulic pump 3 can be controlled (pump absorption torque control). The regulator 14 in this embodiment is controlled by control pressure generated by the electromagnetic proportional valve 15. The electromagnetic proportional valve 15 operates according to a command value outputted from the controller 8.

Figure 2:
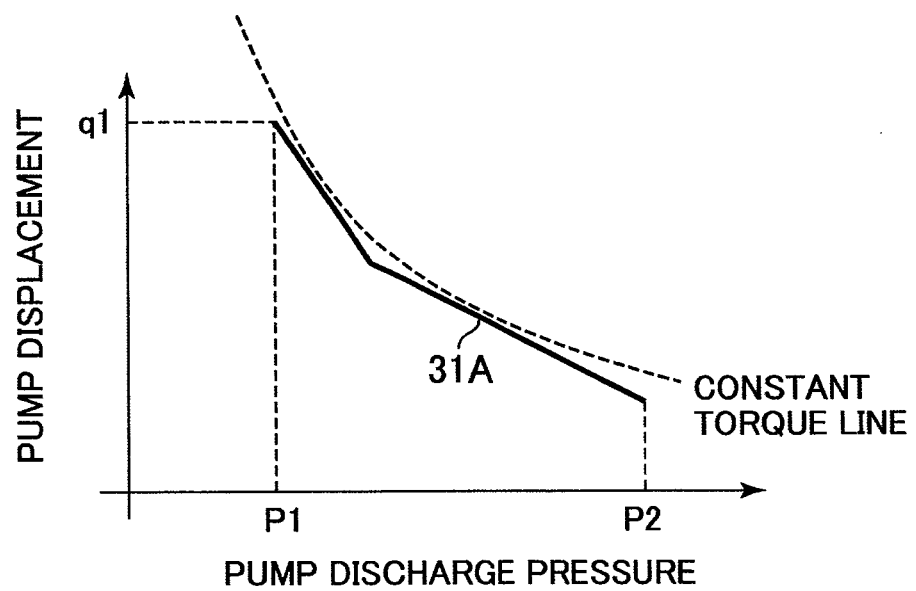
FIG. 2 is a graph showing a pump displacement-pump discharge pressure characteristic of a regulator used in the embodiments of the present invention.

The regulator 14 in this embodiment controls the displacement of the hydraulic pump 3 according to a control characteristic diagram shown in FIG. 2, for example. FIG. 2 is a graph showing the control characteristic of the pump absorption torque control by the regulator 14 according to this embodiment of the present invention. The polygonal line 31A in FIG. 2 indicates the characteristic of the displacement of the hydraulic pump 3 which is set corresponding to the discharge pressure of the hydraulic pump 3. The characteristic has been set so that the torque of the hydraulic pump 3 (product of the pump displacement and the pump discharge pressure) remains substantially constant within the maximum value of the total output of the engine 1 and the motor generator 2 (hyperbolic curve (constant torque line) indicated by the broken line in FIG. 2). Thus, the torque of the hydraulic pump 3 can be controlled so as not to exceed the maximum output of the engine 1 and the motor generator 2, by setting the displacement of the hydraulic pump 3 by using the polygonal line 31A according to the pump discharge pressure at each time. When the pump discharge pressure is P1 or less, the pump absorption torque control is not performed and the pump displacement is determined by the operation amounts of the operating levers for operating the control valves of the valve device 4 (reaches q1 when the operation amount of any operating lever is at the maximum, for example). In contrast, when the pump discharge pressure enters the range between P1 and P2, the pump absorption torque control by the regulator 14 is carried out. In this case, the pump tilting angle is controlled by the regulator 14 so that the pump displacement decreases along the polygonal line 31A with the increase in the pump discharge pressure, by which the pump absorption torque is controlled to remain within the torque specified by the polygonal line 31A. Incidentally, P2 is the maximum value of the pump discharge pressure, which is equal to preset pressure of a relief valve connected to a circuit in a part of the valve device 4 on the hydraulic pump 3's side. The pump discharge pressure does not increase over this value. While the polygonal line 31A made up of a combination of two straight lines is used in this example as the control characteristic diagram of the hydraulic pump absorption torque control, other control characteristic diagrams may also be used as long as the diagram is set within the constant torque line (hyperbolic curve) shown in FIG. 2.

The controller 8 outputs the operation signal (electric signal), generated based on the absorption torque of the hydraulic pump 3, to the electromagnetic proportional valve 15. The electromagnetic proportional valve 15 drives the regulator 14 by generating control pressure corresponding to the operation signal. Accordingly, the displacement of the hydraulic pump 3 is changed by the regulator 14, and the absorption torque of the hydraulic pump 3 is adjusted within a range not causing the engine stall.

The electrical storage device 10 (implemented by a battery or a capacitor) is equipped with a current sensor 11, a voltage sensor 12 and a temperature sensor 13 as means for detecting information necessary for calculating the remaining electric power amount of the electrical storage device 10 (electrical storage information detection means). The controller 8 manages the remaining electric power amount of the electrical storage device 10 by having a remaining electric power amount calculation unit 25 (explained later) calculate the remaining electric power amount of the electrical storage device 10 based on the information such as the current, voltage and temperature detected by the sensors 11, 12 and 13.

Figure 3:
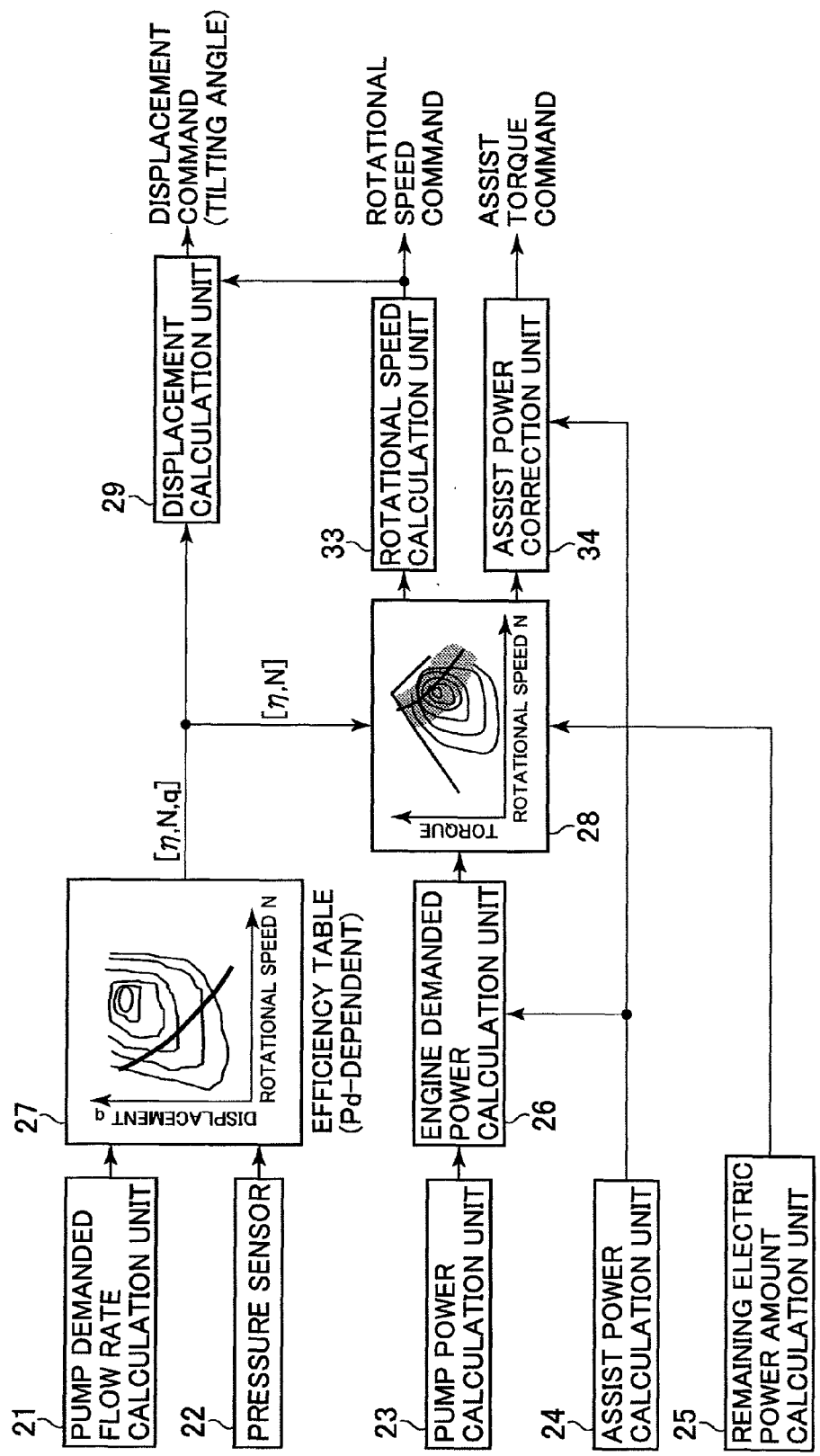
FIG. 3 is a schematic block diagram showing the overall configuration of a controller 8 according to the first embodiment of the present invention.

FIG. 3 is a schematic block diagram showing the overall configuration of the controller 8 according to the first embodiment of the present invention. Components in FIG. 3 identical with those in previous figures are assigned the already-used reference characters and repeated explanation thereof is omitted properly (ditto for subsequent figures).

The controller 8 shown in FIG. 3 calculates command values for the engine 1, the motor generator 2 and the hydraulic pump 3. The controller 8 includes a pump demanded flow rate calculation unit 21, a pump power calculation unit 23, an assist power calculation unit 24, a remaining electric power amount calculation unit 25, an engine demanded power calculation unit 26, a system operating point calculation unit (first operating point calculation unit) 28, a pump operating point calculation unit (second operating point calculation unit) 27, a displacement calculation unit 29, a rotational speed calculation unit 33, and an assist power correction unit 34. The controller 8 includes an arithmetic processing unit for executing various processing programs according to the present invention (e.g., CPU), a storage unit for storing various data such as the processing programs (e.g., ROM and/or RAM), etc. (unshown) as its hardware configuration.

This embodiment aims at improving the system efficiency (also in consideration of the workloads on the actuators 5) relative to the fuel consumption by the engine 1, by controlling the engine 1 and the hydraulic pump 3 and operating them at an appropriate operating point (rotational speed).

The fuel consumption by the engine 1 (engine efficiency) changes according to the rotational speed and the torque during the operation. Meanwhile, the efficiency of the hydraulic pump 3 (pump efficiency) changes according to the rotational speed, the pump displacement and the pump discharge pressure during the operation. Since the rotational speed achieving high engine efficiency does not necessarily coincide with the rotational speed achieving high efficiency of the hydraulic pump 3, setting the target operating point (target rotational speed) at a rotational speed achieving the highest efficiency of either the engine 1 or the hydraulic pump 3 does not necessarily achieve the best (highest) system efficiency. Further, in construction machinery such as a hydraulic excavator, the optimum operating point changes successively since the pump discharge pressure changes greatly in a short time and the efficiency of the hydraulic pump 3 changes greatly according to the discharge pressure.

Therefore, the controller 8 in this embodiment successively calculates an appropriate target value of the rotational speed according to the torque (power), the pump displacement and the pump discharge pressure (factors influencing the system efficiency) and performs the control of the engine 1 and the hydraulic pump 3 based on the calculated target rotational speed.

The pump demanded flow rate calculation unit 21 is a part for executing a process of calculating the flow rate of the hydraulic pump necessary for securing the operations of the hydraulic actuators intended by the operator (demanded flow rate).

Figure 4:
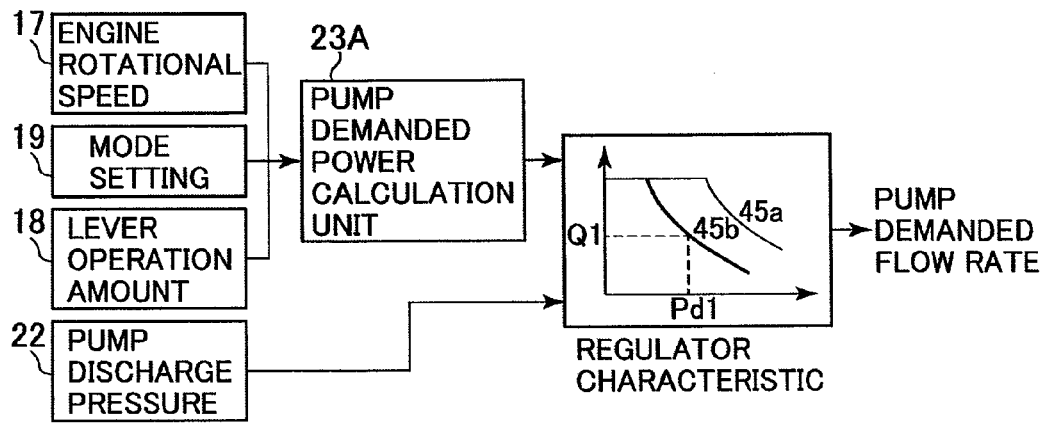
FIG. 4 is a schematic block diagram showing an example of the configuration of a pump demanded flow rate calculation unit 21.
Figure 5:
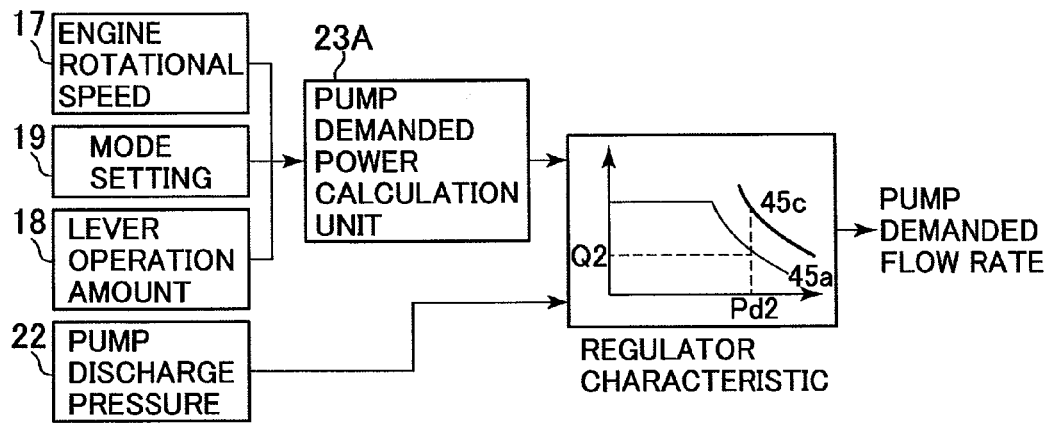
FIG. 5 is a schematic block diagram showing the example of the configuration of the pump demanded flow rate calculation unit 21.

FIGS. 4 and 5 are schematic block diagrams showing an example of the configuration of the pump demanded flow rate calculation unit 21. The pump demanded flow rate calculation unit 21 shown in FIGS. 4 and 5 calculates the demanded flow rate of the hydraulic pump 3 based on demanded power of the hydraulic pump 3 calculated by a pump demanded power calculation unit 23A and the discharge pressure of the hydraulic pump 3 detected by the pressure sensor 22. FIG. 4 shows a case where the pump demanded power 45b calculated by the pump demanded power calculation unit 23A is within a limit value 45a (which corresponds to the polygonal line 31A shown in FIG. 2), while FIG. 5 shows a case where the pump demanded power 45c is greater than the limit value 45a. Incidentally, the regulator characteristics shown in the figures are for limiting the torque as shown in FIG. 2, whereas the control is performed in the dimension of flow rate (=displacement× rotational speed). Thus, the regulator characteristic in FIG. 4 is indicated in terms of pump power (=torque×rotational speed) to unify the dimension.

Inputted to the pump demanded power calculation unit 23A are the target rotational speed of the engine 1 specified through the engine control dial 17, the type of the operation mode specified through the operation mode selector switch 19, and the operation amounts of the operating levers 16 (lever operation amounts). In this embodiment, a lever operation amount is determined from the detection values of the pressure sensors 18a and 18b. The pump demanded power calculation unit 23A judges how heavy load of operation is presumed by the operator based on the operation mode and the engine rotational speed set by the operator, and previously sets (calculates) pump power that is expected to become necessary (pump demanded power) based on the judgment and the lever operation amounts. In this case, the calculated value of the pump demanded power increases when the engine control dial 17 is set at a relatively great value, the operation mode is the power mode, and the lever operation amount is relatively large. Conversely, the calculated value of the pump demanded power decreases when the engine control dial 17 is set at a relatively small value, the operation mode is the energy saving mode, and the lever operation amount is relatively small.

The pump demanded flow rate calculation unit 21 compares the demanded power calculated by the pump demanded power calculation unit 23A with the power limit value 45a which is set based on the regulator characteristic of the hydraulic pump 3. When the demanded power is within the limit value 45a, the pump demanded flow rate calculation unit 21 calculates the demanded flow rate by dividing the demanded power by the discharge pressure detected by the pressure sensor 22. In contrast, when the demanded power is greater than the limit value 45a, the pump demanded flow rate calculation unit 21 calculates the demanded flow rate by dividing the limit value 45a by the discharge pressure. Thus, in the case of FIG. 4, the intersection point of the pump demanded power (indicated by the constant power line 45b) and the pump discharge pressure Pd1 measured by the pressure sensor 22 represents the demanded flow rate Q1. In contrast, in the case of FIG. 5, the pump demanded power indicated by the constant power line 45c is greater than the limit value 45a, and thus the intersection point of the limit value 45a and the pump discharge pressure Pd2 represents the demanded flow rate Q2. In the case of FIG. 5, the operation of the hydraulic actuator 5 becomes sluggish due to insufficient supply of power to the hydraulic actuator 5. However, the lug-down and engine stall can be prevented thanks to the prevention of an excessive engine load. Incidentally, the means for calculating the pump demanded flow rate shown in FIGS. 4 and 5 is just an example; the method for calculating the pump demanded flow rate is not restricted to this example.

Returning to FIG. 3, the pump power calculation unit 23 is a part for executing a process of calculating the actual pump power outputted by the hydraulic pump 3. The actual pump power can be calculated by multiplying the pump discharge pressure (detected through the pressure sensor 22) and the pump discharge flow rate (detected through the flow rate sensor), for example. It is also possible to use the value calculated by the pump demanded power calculation unit 23A shown in FIGS. 4 and 5 (demanded pump power) instead of the actual pump power. In this case of using the demanded pump power, the control is performed by means of the feed forward control and thus the probability of quickly realizing the intended operation increases. Consequently, the operability can be improved.

The assist power calculation unit 24 is a part for executing a process of calculating the power actually outputted by the motor generator 2. The assist power can be calculated from the product of the rotational speed of the motor generator 2 and the torque at that point of time, for example. Similarly to the calculation by the pump power calculation unit 23, it is also possible to calculate assist demanded power (demanded assist power) from the product of the target rotational speed of the motor generator 2 and the target value of the torque and use the assist demanded power (demanded assist power) instead of the assist power. For the subsequent processes, the sign of the assist power is assumed to be positive when the motor generator 2 operates as a motor, and negative when the motor generator 2 operates as a generator.

The judgment on whether the motor generator 2 should be operated as a motor or a generator and the magnitude of the power to be generated by the motor generator 2 is made based on the remaining electric power amount of the electrical storage device 10 calculated by the remaining electric power amount calculation unit 25. This judgment may either be made based on the remaining electric power amount at the time of the control or based on the difference between the remaining electric power amount and a target remaining electric power amount at the time of the control.

Figure 6:
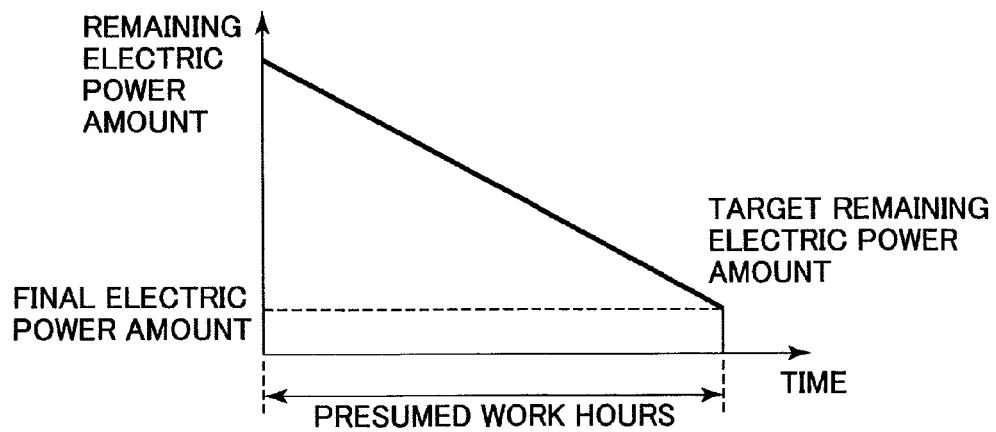
FIG. 6 is an explanatory drawing showing a case where a judgment on the operation of a motor generator is made based on the difference between a remaining electric power amount and a target remaining electric power amount at the time of control.

FIG. 6 is an explanatory drawing showing a case where the judgment on the operation of the motor generator 2 (motor operation/generator operation) is made based on the difference between the remaining electric power amount and the target remaining electric power amount at the time of the control. In FIG. 6, the working hours in a day are previously set as presumed working hours. It is assumed that the electric power is used up (till the voltage of the electrical storage device 10 drops to a final voltage) in the presumed working hours. The power generation is executed preferentially if the actual remaining electric power amount at a certain time is lower than the target remaining electric power amount at that time. Conversely, the motor assistance is executed preferentially if the actual remaining electric power amount is higher than the target remaining electric power amount. Incidentally, the above-described management of the remaining electric power amount according to the target remaining electric power amount presuming the working hours is especially effective in construction machinery having a battery arranged in the electrical storage device 10 and having a configuration capable of storing the electricity (electric energy) up to the maximum level before starting the work/operation (e.g., plug-in hybrid system).

The remaining electric power amount calculation unit 25 is a part for executing a process of calculating the remaining electric power amount of the electrical storage device 10. The remaining electric power amount can be calculated based on the information (current, voltage, temperature, etc.) detected by the sensors 11, 12 and 13, for example.

The system operating point calculation unit (first operating point calculation unit) 28 is a part for executing a process of calculating a plurality of combinations of engine rotational speed and engine torque (operating points) with which the demanded power of the engine 1 can be generated and further calculating the system efficiency in each of the combinations based on the discharge pressure of the hydraulic pump 3. Here, the "system efficiency" means the energy efficiency of the entire system which is obtained by multiplying the energy efficiency of the engine 1 and the energy efficiency of the hydraulic pump 3 together. The demanded power of the engine 1 is load power seen from the engine 1. The demanded power of the engine 1 is determined based on the demanded power of the hydraulic pump 3, etc. as will be explained later.

In this embodiment, the efficiency of the hydraulic pump 3 corresponding to the demanded flow rate and the discharge pressure of the hydraulic pump 3 is calculated first by the pump operating point calculation unit (second operating point calculation unit) 27. Thereafter, based on the calculated efficiency of the hydraulic pump 3 and the efficiency of the engine 1, the system efficiency in each combination of engine rotational speed and engine torque is calculated by the system operating point calculation unit 28. By calculating the system efficiency after calculating the pump efficiency at a certain discharge pressure as above, the computational load on the controller 8 can be reduced and the performance required of the hardware configuration of the controller 8 can be lowered. In cases where there is no restriction on the performance of the hardware configuration of the controller 8, it is possible to leave out the calculation by the pump operating point calculation unit 27 and calculate the combination of engine rotational speed, engine torque and system efficiency from the engine demanded power by using the system operating point calculation unit 28 alone.

Next, the flow of the calculation by the pump operating point calculation unit 27 and the system operating point calculation unit 28 in this embodiment will be explained below. First, the pump operating point calculation unit 27 executes a process of calculating a plurality of combinations of pump rotational speed and pump displacement (operating points) with which the demanded flow rate of the hydraulic pump 3 can be generated and further calculating the energy efficiency of the hydraulic pump 3 in each of the combinations based on the discharge pressure of the hydraulic pump 3.

Figure 7:
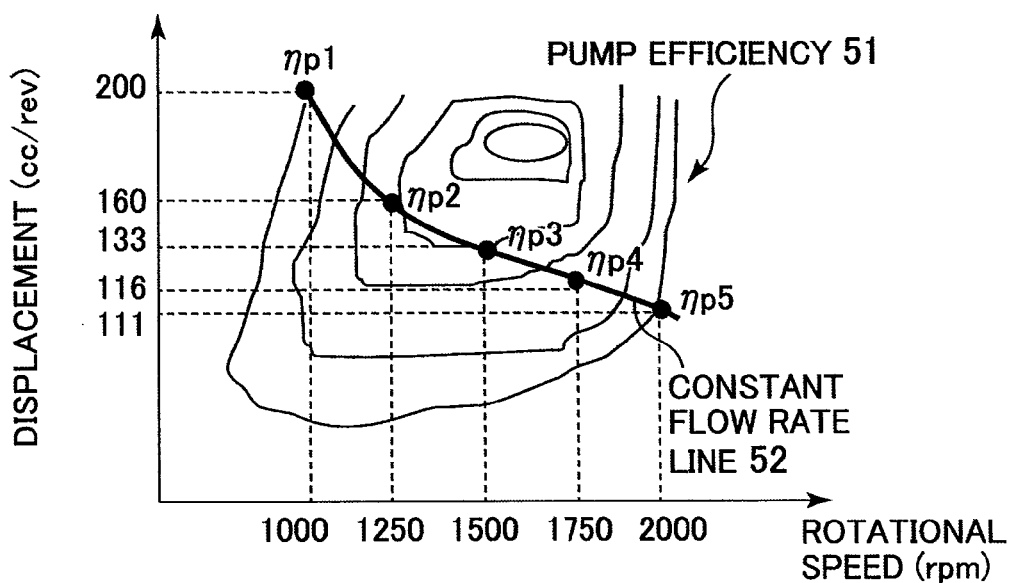
FIG. 7 is a schematic diagram showing a pump efficiency map generated by a second operating point calculation unit 27.

FIG. 7 is a schematic diagram showing a pump efficiency map generated by the pump operating point calculation unit 27. The pump efficiency map shown in FIG. 7 has axes representing the pump rotational speed and the pump displacement. The pump efficiency corresponding to each combination of rotational speed and displacement is indicated by a contour line 51. This pump efficiency map is generated based on the pump discharge pressure. The shape of the pump efficiency contour line changes depending on the pump discharge pressure. This is because the efficiency of the hydraulic pump 3 changes depending on the pump discharge pressure.

The pump demanded flow rate calculated by the pump demanded flow rate calculation unit 21 is indicated as a constant flow rate line on the pump efficiency map. Specifically, the pump demanded flow rate is indicated as an inverse proportion curve 52 on the pump efficiency map as shown in FIG. 7 since the pump flow rate is the product of the rotational speed and the pump displacement. Therefore, if a constant flow rate line (curve) corresponding to the demanded flow rate of the hydraulic pump 3 is indicated on the pump efficiency map, coordinates of a point on the curve represent a combination of pump rotational speed and pump displacement with which the demanded flow rate of the hydraulic pump 3 can be generated. For example, in a case where the pump demanded flow rate is 200 L/min and the target rotational speed is searched for in steps of 250 rpm in a range between a minimum rotational speed of 1000 rpm and a maximum rotational speed of 2000 rpm, five combinations of rotational speed and pump displacement (1000 rpm, 200 cc/rev), (1250 rpm, 160 cc/rev), . . . , (2000 rpm, 111 cc/rev) are found and the pump efficiency at each operating point can be figured out from the efficiency map as $\eta p1$-$\eta p5$.

The engine demanded power calculation unit 26 is a part for executing a process of calculating the demanded power of the engine 1. The engine demanded power in this embodiment is determined by subtracting the output of the assist power calculation unit 24 (assist power) from the output of the pump power calculation unit 23 (pump power) (i.e., engine demanded power=pump power−assist power). Incidentally, the output of the assist power calculation unit 24 is represented as a positive value when the motor generator 2 is performing the motor assistance, and as a negative value when the motor generator 2 is performing the power generation.

The system operating point calculation unit 28 calculates a plurality of combinations of engine rotational speed, engine torque and system efficiency capable of realizing the pump demanded flow rate determined by the pump demanded flow rate calculation unit 21 based on the combinations of pump rotational speed, pump displacement and pump efficiency determined by the pump operating point calculation unit 27, the engine demanded power determined by the engine demanded power calculation unit 26, and the remaining electric power amount determined by the remaining electric power amount calculation unit 25.

Figure 8:
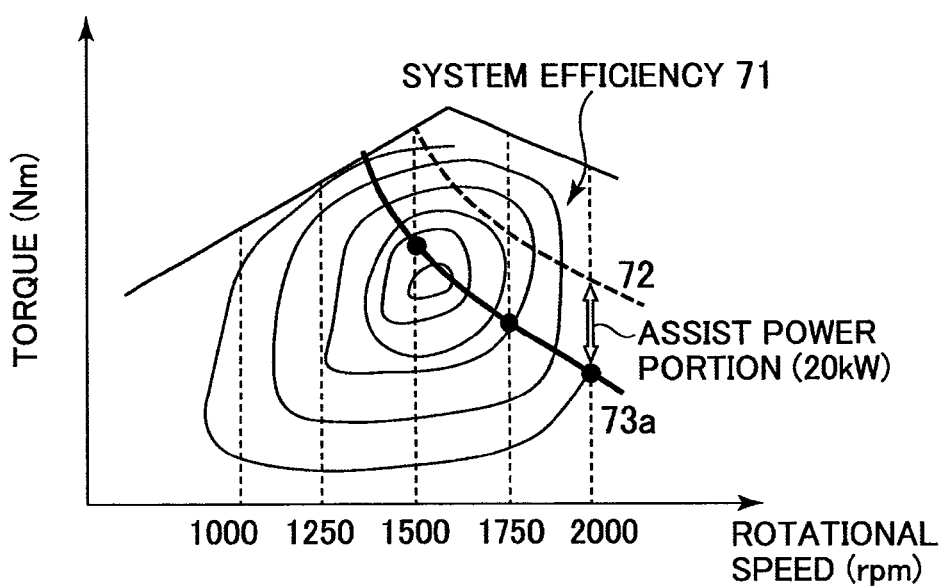
FIG. 8 is a schematic diagram showing a system efficiency map generated by a first operating point calculation unit 28 according to the first embodiment of the present invention.

FIG. 8 is a schematic diagram showing a system efficiency map generated by the system operating point calculation unit 28. The system efficiency map shown in FIG. 8 has axes representing the engine rotational speed and the engine torque. The system efficiency corresponding to each combination of rotational speed and torque is indicated by a contour line 71. The system efficiency shown in FIG. 8 is calculated by multiplying the pump efficiency at each rotational speed (calculated by the pump operating point calculation unit 27) by engine efficiency that is obtained from an efficiency map (or a constant fuel efficiency map) of the engine 1 previously stored in the storage unit of the controller 8 or the like. Since the pump efficiency changes with the change in the pump discharge pressure as mentioned above, the system efficiency shown in FIG. 8 also changes depending on the pump discharge pressure, that is, the position of the bull's eye (region represented by the contour line of the highest efficiency) in the map moves depending on the discharge pressure.

Incidentally, the pump power calculated by the pump power calculation unit 23, the assist power calculated by the assist power calculation unit 24, and the engine demanded power calculated by the engine demanded power calculation unit 26 can be indicated as constant power lines on the system efficiency map since the power is the product of the rotational speed and the torque. It is assumed here that the target rotational speed is searched for in steps of 250 rpm (similarly to the case of the pump operating point calculation unit 27) in FIG. 8, the motor generator 2 is in the state of generating the assist power, and the pump power, the assist power and the engine demanded power equal 80 kW, 20 kW and 60 kW (difference between the pump power and the assist power (80 kW−20 kW)), respectively. In this case, the pump power (80 kW) can be represented by the dotted curve 72 in FIG. 8 and the engine demanded power (60 kW) can be represented by the solid curve 73a in FIG. 8. Therefore, the combination to be finally acquired exists in the combinations of the coordinates of each point on the curve 73a representing the engine demanded power (engine rotational speed, engine torque) and the system efficiency corresponding to each point.

The rotational speed calculation unit 33 is a part for executing a process of figuring out the engine rotational speed included in one of the combinations (of engine rotational speed, engine torque and system efficiency) calculated by the system operating point calculation unit 28 that includes desired system efficiency as the target rotational speed of the engine 1. In other words, the rotational speed calculation unit 33 executes a process of selecting a point having the desired system efficiency from the points on the curve 73a shown in FIG. 8. Thus, in a case where a point having the best (highest) system efficiency is selected in the example of FIG. 8, "1500 rpm" represented by the point closest to the bull's eye of the efficiency map is figured out as the target rotational speed. Accordingly, the controller 8 controls the engine 1 by using 1500 rpm as the target rotational speed.

The displacement calculation unit 29 is a part for executing a process of calculating target displacement of the hydraulic pump 3 based on the target rotational speed calculated by the rotational speed calculation unit 33 and the demanded flow rate of the hydraulic pump 3 calculated by the pump demanded flow rate calculation unit 21. Referring again to FIG. 7, the target displacement is "133 cc/rev" since the pump displacement equals 133 cc/rev when the target rotational speed is 1500 rpm. Accordingly, the controller 8 controls the regulator 14 (electromagnetic proportional valve 15) so that the pump displacement equals 133 cc/rev.

With the control device for construction machinery according to this embodiment configured as above, the engine and the hydraulic pump can be controlled at an operating point where the efficiency of the entire system is excellent (high) since the engine target rotational speed can be determined based on the system efficiency characteristic diagram (the efficiency map shown in FIG. 7) calculated from the pump efficiency and the engine efficiency at a certain discharge pressure. Therefore, the efficiency of the entire system can be improved compared to the case where the target rotational speed is calculated considering the engine efficiency alone (like the technology described in JP-2009-74405-A). In other words, the fuel consumption of the engine relative to the workload of the hydraulic actuators (workload fuel consumption) can be minimized, which has been impossible by the conventional technology determining the target operating point based on the operational characteristic of the engine alone. This feature is effective when the downsizing of the engine is promoted to reduce the fuel consumption, the engine is operated at higher rotational speeds than ever, and the operating point achieving high efficiency of the engine greatly deviates from the operating point achieving high efficiency of the pump as a result of the higher engine speed. Further, the control device of this embodiment does not lead to the complication of the power train and the increase in the total capacity of the power train like the technology described in JP-2004-84470-A. Furthermore, since the operating point achieving the best system efficiency is determined in this embodiment while maintaining a necessary pump flow rate (demanded pump flow rate), the operational feel does not differ from that of construction machinery not equipped with the control device according to the present invention. Consequently, highly efficient operation with no feeling of strangeness to the operator can be realized. It is also possible to reduce nitrogen oxides and particulate matter contained in the exhaust gas by optimizing the combustion operation point in the engine similarly to the conventional technology.

Moreover, in this embodiment, the demanded power of the engine 1 is calculated based on the assist power of the motor generator 2 and the power of the hydraulic pump 3, and the operating point is calculated based on the calculated demanded power of the engine 1. Therefore, the over revolution (excessive engine speed) caused by excessive total output and the engine stall caused by insufficient total output can be avoided. In addition, deterioration in the exhaust gas condition can be prevented since transient combustion (which can occur when the engine output is increased rapidly) can be suppressed through the use of the motor generator 2.

Figure 9:
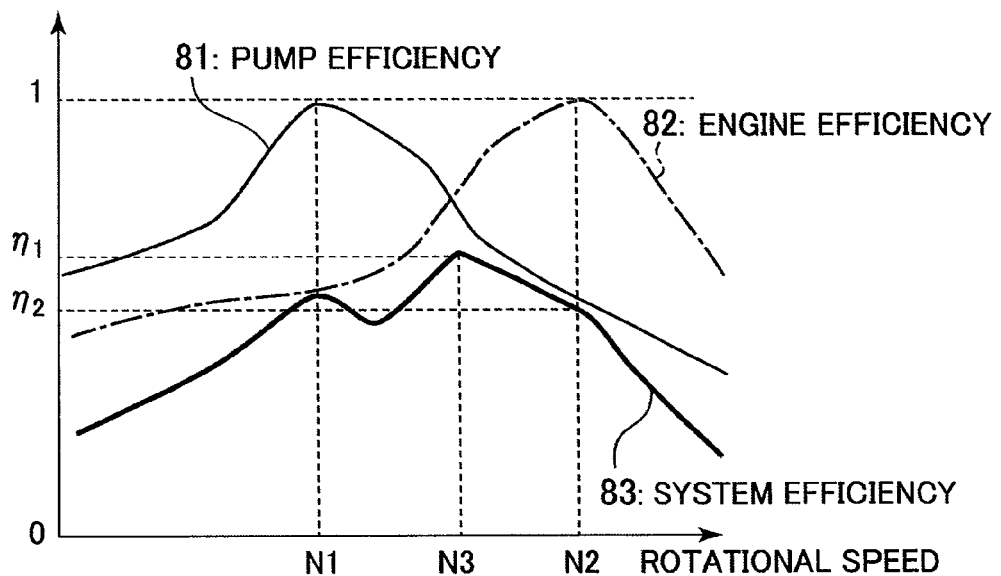
FIG. 9 is a schematic diagram showing the difference in engine target rotational speed between the present invention and a conventional technology.

FIG. 9 shows the difference in the engine target rotational speed between the present invention and the conventional technology. The curve 81 in FIG. 9 indicates the total efficiency of the pump (the pump displacement is assumed to be at the maximum) at a certain level of power (fixed power). The curve 82 indicates the engine efficiency with reference to the best fuel efficiency point of the engine 1 at the time of the fixed power. The curves 81 and 82 are normalized so that their maximum values equal 1. The curve 83 indicates the system efficiency as the product of the pump efficiency and the engine efficiency.

For example, in the case of a pump having pump power of 80 kW and maximum efficiency of 90%, the values 90% and 80% are expressed as 1 and 0.89, respectively. On the other hand, assuming that the fuel consumption rate at the best fuel efficiency point at 80 kW is 15 liters per hour on the engine efficiency line, the operating point where the fuel consumption rate equals 15 liters per hour can be expressed as efficiency 1, and the operating point where the fuel consumption rate equals 20 liters per hour can be expressed as efficiency 0.75 (defined by the ratio to the best value).

In the above embodiment, the pump efficiency at each operating point is judged by the function of the controller 8 and then the target rotational speed is determined based on the engine efficiency map (engine fuel efficiency map). Thus, the rotational speed N3 in FIG. 9 can be determined as the target rotational speed. The system efficiency in this case is determined as η1 from the product of the pump efficiency and the engine efficiency. At this point, the system efficiency hits the best (maximum) under the condition that the engine and the pump are operated at the same rotational speed.

Meanwhile, in the technology described in JP-2004-84470-A (Patent Literature 3), the pump and the engine can be operated respectively at their maximum efficiency points N1 and N2 by use of a CVT (Continuously Variable Transmission), and thus the system efficiency is equal to efficiency η3 (unshown) of the transmission. The system efficiency η1 achieved by this embodiment can be higher than this system efficiency in cases where the efficiency η3 of the transmission is low.

Meanwhile, in the technology described in JP-2009-74405-A (Patent Literature 2), the rotational speed N2 at the optimum fuel efficiency point of the engine is the target rotational speed when the pump displacement is at the maximum. The system efficiency η2 in this case is always lower than the system efficiency η1 of this embodiment since the system efficiency η2 does not take the pump efficiency into account. Incidentally, the system efficiency η2 in the technology of the Patent Literature 2 becomes equal to the system efficiency η1 in the present invention (η1=η2=1) only when the peak of the pump efficiency and the peak of the engine efficiency coincide with each other. In this case, the system efficiency η3 achieved by the technology of the Patent Literature 3 becomes the lowest.

While the example of FIG. 9 illustrates a case where the maximum efficiency point of the pump is relatively close to the maximum efficiency point of the engine, there are cases where the maximum efficiency points of the pump and the engine greatly differ from each other. In such cases, it is desirable to bring the two maximum efficiency points closer to each other by arranging a transmission having a fixed gear ratio between the engine 1 and the hydraulic pump 3. However, in cases where the relationship "η1<η1'×ηg" does not hold between the efficiency η1 in this embodiment (in the case where no transmission is used) and the product of the efficiency η1' in the present invention (in the case where the transmission is used) and the efficiency ηg of the transmission, not using the transmission is desirable since the use of the transmission deteriorates the maximum efficiency.

Incidentally, the system efficiency can be improved further by having the assist power correction unit 34 (explained below) modify the engine demanded power by correcting the assist power according to the remaining electric power amount of the electrical storage device 10. In short, optimization of the system efficiency can be realized in an active manner.

The assist power correction unit 34 is a part for executing a process of correcting the power generated by the motor generator 2 (assist power) so that the desired system efficiency (e.g., the best system efficiency on the efficiency map) is included in the combinations of engine rotational speed, engine torque and system efficiency calculated by the system operating point calculation unit 28. In this explanation, a case where the assist power correction unit 34 makes the correction so that the point Pb (see FIG. 10) achieving the best efficiency (as the desired system efficiency) is included in the combinations will be explained by referring to FIG. 9.

Figure 10:
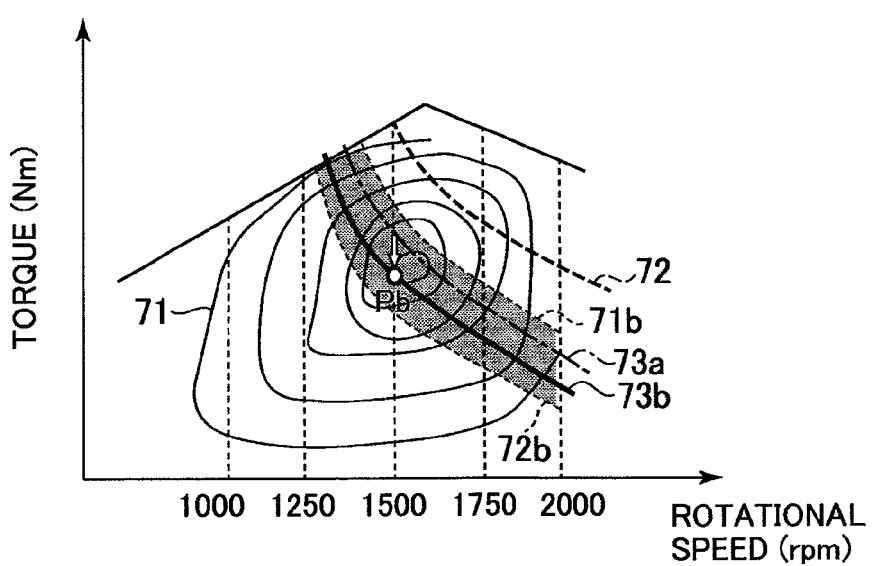
FIG. 10 is another schematic diagram showing the system efficiency map generated by the first operating point calculation unit 28 according to the first embodiment of the present invention.

FIG. 10 is another schematic diagram showing the system efficiency map generated by the system operating point calculation unit 28. In FIG. 10, the operating point at the rotational speed 1500 rpm is judged to be the closest to the system efficiency optimum point Pb (center of the bull's eye). Thus, the assist power correction unit 34 corrects the assist power so that the constant power line of the engine demanded power is the curve 73b passing through the point Pb. In this case, the assist power after the correction by the assist power correction unit 34 equals the sum of the original assist power (output of the assist power calculation unit 24 (20 kW)) and the arrow (5 kW) in FIG. 10. The assist power correction unit 34 outputs the corrected assist power to the inverter 9 as an assist torque command. Thus, the controller 8 controls the motor generator 2 according to the corrected assist power. In this example, the assist power correction unit 34 outputs a value 160 Nm (corresponding to 25 kW at 1500 rpm) as the assist torque command. The assist torque command may also be determined from the rotational speed at the present time (i.e., 25 kW÷rotational speed (rad/s) at the present time).

Thanks to the above correction of the assist power of the motor generator 2 by the assist power correction unit 34, operation at an operating point with higher system efficiency becomes possible compared to the case where only the engine is the source of the power.

The above explanation was about the case where the desired system efficiency exists below the constant power line 72 of the pump demanded power and the engine demanded power is decreased by operating the motor generator 2 as a motor. In cases where the desired system efficiency exists above the constant power line 72, it is of course desirable to correct the assist power so as to achieve the desired system efficiency by operating the motor generator 2 as a generator and raising the engine demanded power.

In cases where the assist power is corrected as above by the assist power correction unit 34, the correction of the assist output is desired to be made within a range capable of preventing the overcharge/overdischarge of the electrical storage device 10 in consideration of the remaining electric power amount of the electrical storage device 10 calculated by the remaining electric power amount calculation unit 25. This is because it is possible to drive the power train at a point closer to the operating point for achieving the desired system efficiency since the operating point calculation can be made according to the remaining electric power amount of the electrical storage device 10 and the power of the motor generator 2 (information on the operating status of the construction machinery). The hatched region in FIG. 10 represents an operable region of the motor generator 2 judged by the remaining electric power amount calculation unit 25. The operable region is determined by the remaining electric power amount of the electrical storage device 10 at the time of the control (time t1 in FIG. 11).

Figure 11:
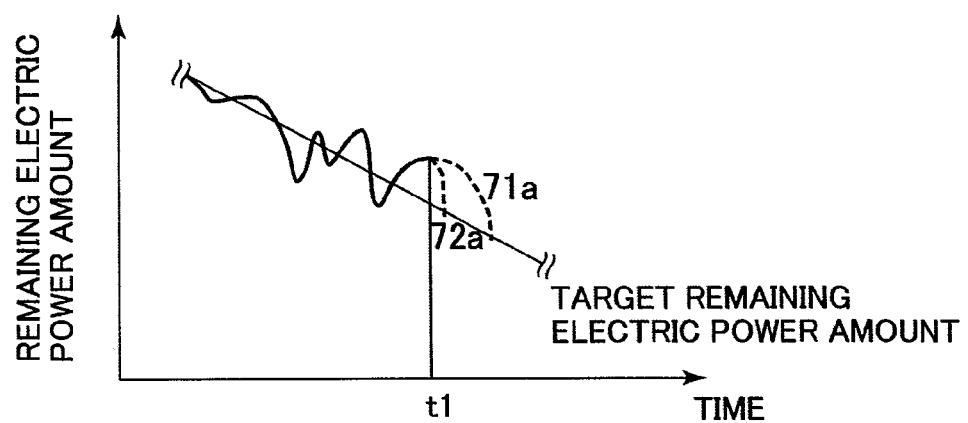
FIG. 11 is a schematic diagram showing an example of the change in the remaining electric power amount with respect to the target remaining electric power amount.

FIG. 11 is a schematic diagram showing an example of the change in the remaining electric power amount with respect to the target remaining electric power amount. At the time t1 in FIG. 11, the remaining electric power amount is greater than the target remaining electric power amount, and thus it is judged that electric power has to be discharged from the electrical storage device 10 by having the motor generator 2 carry out the assistance. In cases where the remaining electric power amount is gradually brought close to the target remaining electric power amount by using enough time, the assist power outputted per unit time is relatively low, and thus the electric power is consumed as indicated by the curve 71a, for example. This is a discharge plan corresponding to the curve 71b in FIG. 10. In contrast, in cases where the remaining electric power amount is brought close to the target remaining electric power amount by means of a quick discharge, the assist power outputted per unit time is relatively high, and thus the electric power is consumed as indicated by the curve 72a, for example. This is a discharge plan corresponding to the curve 72b in FIG. 10.

Thanks to the above-described calculation/correction of the assist power of the motor generator 2, upper and lower limits of the assist torque command for the motor generator 2 can be determined according to the remaining electric power amount of the electrical storage device 10. Consequently, the electrical storage device 10 can be used within an appropriate range of use and the overcharge/overdischarge can be prevented.

Incidentally, while the rotational speed calculation unit 33 in the above explanation was assumed to output the result of the calculation of the target rotational speed as one point as shown in FIG. 8, the target rotational speed may also be designated by a region having a prescribed width (target rotational speed region).

Figure 12:
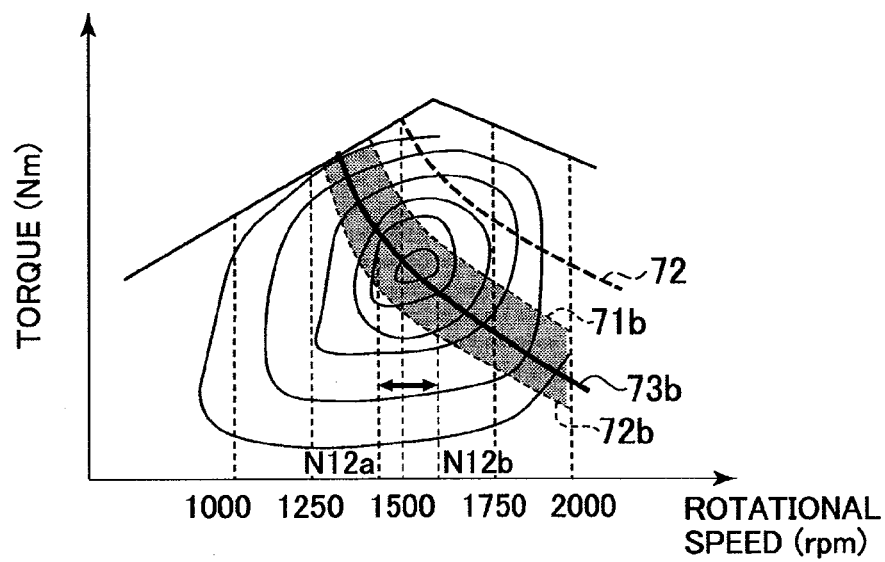
FIG. 12 is an explanatory drawing showing a case where the engine target rotational speed is designated by a certain region.

FIG. 12 is an explanatory drawing showing a case where the engine target rotational speed is designated by a certain region. In the case shown in FIG. 12, the rotational speed control is performed in a way in which it is considered to be sufficient if the region where the system efficiency is a prescribed value or higher (i.e., the region where the contour line height is a prescribed value or higher) is situated between N12a and N12b in terms of the engine rotational speed. When such a target rotational speed region is employed, the calculation of the displacement command by the displacement calculation unit 29 is performed as "target pump flow rate÷rotational speed at the present time" by using the rotational speed at that time similarly to the aforementioned calculation of the assist torque command. For example, assuming that the actual rotational speed is 1550 rpm in a case where the target rotational speed region has been set as the range between 1450 rpm and 1600 rpm, the displacement command for realizing the pump demanded flow rate (assumed here to be 200 L/min) may be determined as "200 L/min (=200×1000 cc/min)÷1550 rpm"=129 cc/rev.

In cases where the region is of the type in which the contour line slope is gentle (i.e., the system efficiency does not change greatly with the change in the rotational speed), it is also possible to employ a method giving a certain margin to the optimum rotational speed. For example, it is sufficient if the engine rotational speed is controlled to keep the actual rotational speed within ±100 rpm of the optimum rotational speed 1500 rpm shown in FIG. 12 (i.e., between 1400 rpm-1600 rpm).

While the above embodiment was configured by integrating a lot of functions in the controller 8, the present invention can be implemented even if other configurations are employed in consideration of restriction by the hardware configuration of the controller 8 (capacity of the storage unit (e.g., memory capacity), processing speed of the CPU, etc.), the presence/absence of various types of sensors, and the configuration of the construction machinery. Examples of such configurations will be described below. While the target rotational speed is designated as one point (similarly to the example shown in FIG. 8) in the following embodiments, it is also possible to employ a configuration in which the target rotational speed is designated in the form of a region similarly to the example shown in FIG. 12.

Figure 13:
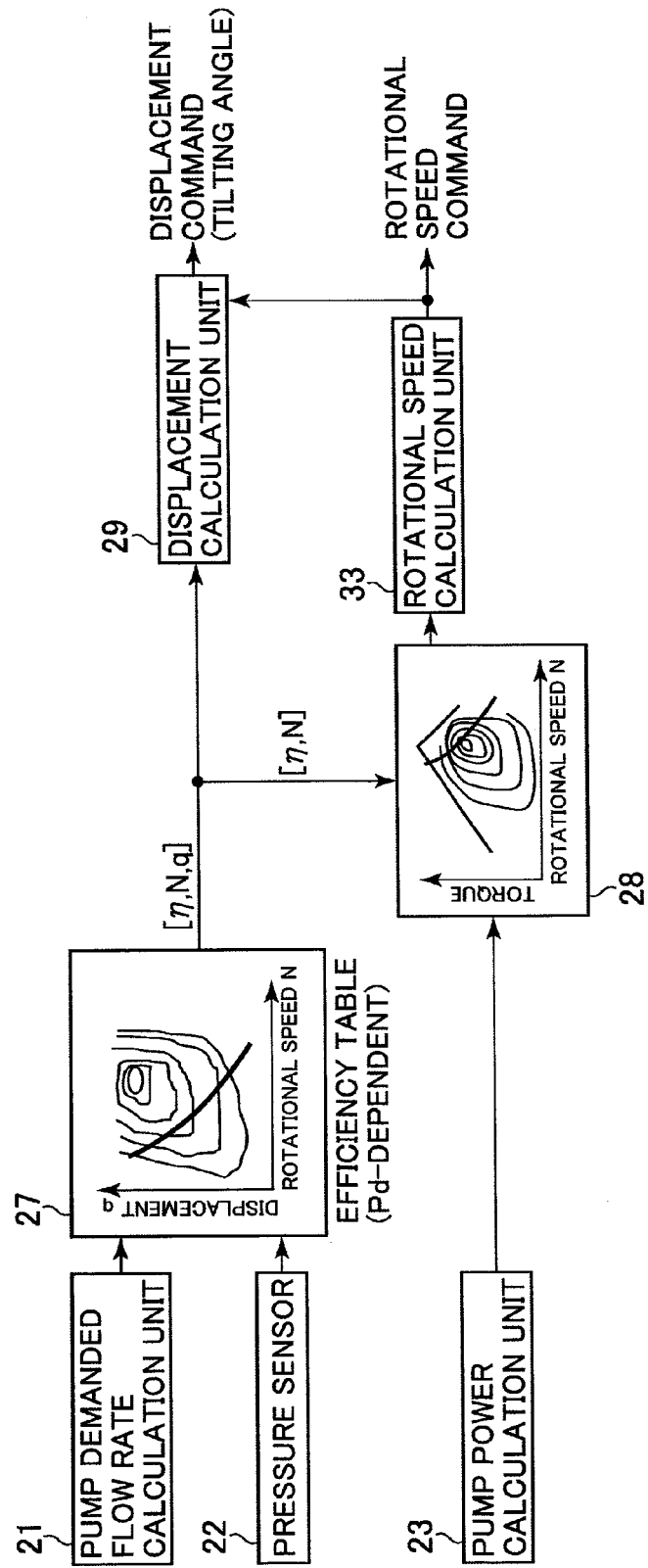
FIG. 13 is a schematic diagram showing the overall configuration of a controller according to a second embodiment of the present invention.
Figure 14:
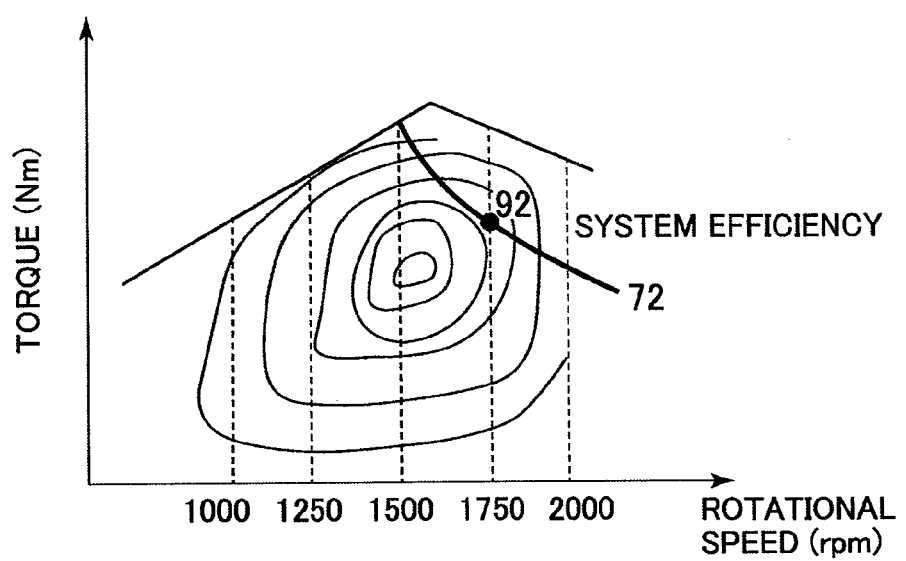
FIG. 14 is a schematic diagram showing a system efficiency map generated by a first operating point calculation unit 28 according to the second embodiment of the present invention.

FIG. 13 is a schematic diagram showing the overall configuration of a controller according to a second embodiment of the present invention. The controller shown in FIG. 13 is for an ordinary type of hydraulic excavator not equipped with the motor generator 2 or the electrical storage device 10. Therefore, the assist power calculation unit 24, the remaining electric power amount calculation unit 25, the engine demanded power calculation unit 26 and the assist power correction unit 34 have been left out from the configuration shown in FIG. 3. In this embodiment, the operating point achieving the desired system efficiency is calculated by drawing a constant power line 72 of the pump power (see FIG. 14) outputted from the pump power calculation unit 23 on the system efficiency map calculated by the system operating point calculation unit 28. FIG. 14 is a schematic diagram showing the system efficiency map generated by the system operating point calculation unit 28. In the case of FIG. 14, the operating point achieving the best system efficiency is the point 92 and the target rotational speed of the engine 1 can be calculated as 1750 rpm.

Figure 15:
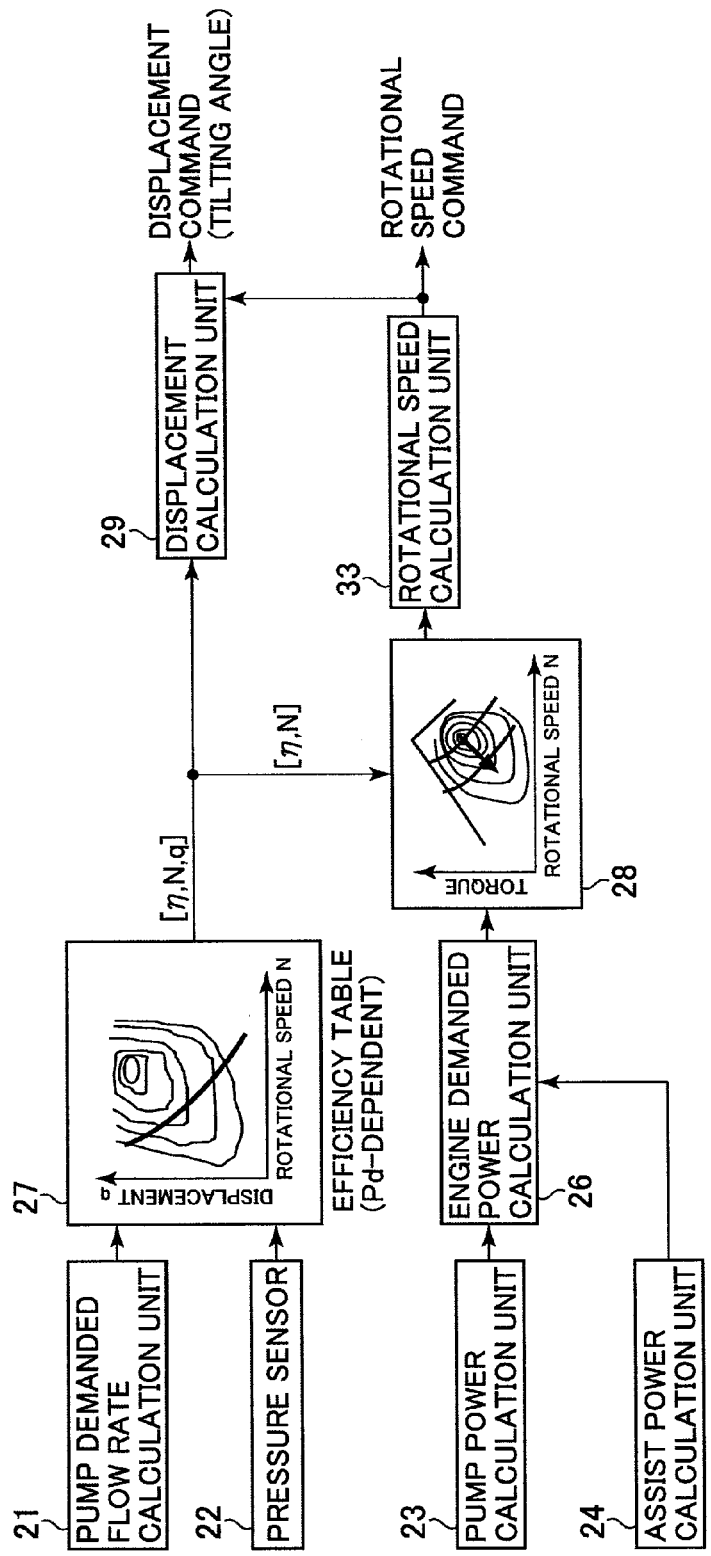
FIG. 15 is a schematic diagram showing the overall configuration of a controller according to a third embodiment of the present invention.
Figure 16:
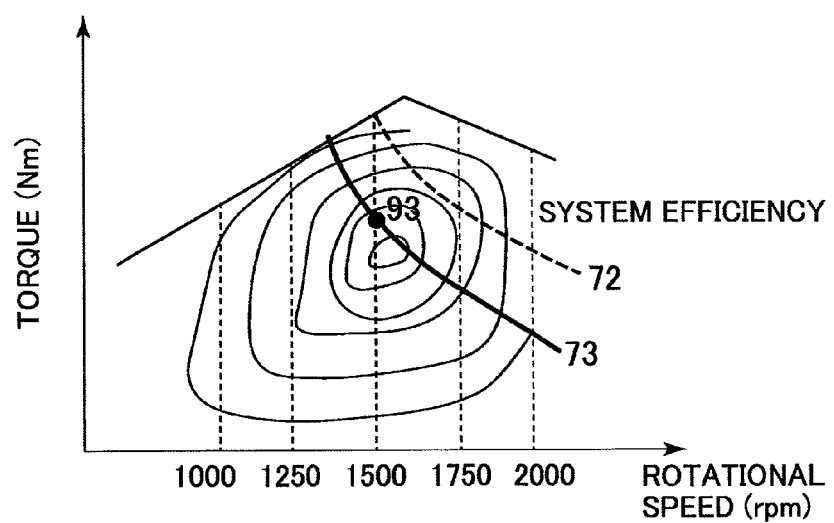
FIG. 16 is a schematic diagram showing a system efficiency map generated by a first operating point calculation unit 28 according to the third embodiment of the present invention.

FIG. 15 is a schematic diagram showing the overall configuration of a controller according to a third embodiment of the present invention. The controller shown in FIG. 15 is for a hybrid hydraulic excavator equipped with the motor generator 2. This controller corresponds to a configuration obtained by leaving out the remaining electric power amount calculation unit 25 and the assist power correction unit 34 from the configuration shown in FIG. 3. In this embodiment, the operating point can be calculated by having the engine demanded power calculation unit 26 calculate the engine demanded power by subtracting the assist power from the pump power and then drawing a constant power line 73 of the engine demanded power on the system efficiency map. FIG. 16 is a schematic diagram showing the system efficiency map generated by the system operating point calculation unit 28. In the case of FIG. 16, the operating point achieving the best system efficiency is the point 93 and the target rotational speed of the engine 1 can be calculated as 1500 rpm.

The configuration according to this embodiment is effective for construction machinery equipped with both a hydraulic actuator and an electric actuator (e.g., hydraulic excavator in which the swing motor for swinging the upper swing structure is electrified). Specifically, the configuration of this embodiment is suitable for cases where power regenerated by an electric motor is used as the assist power of the motor generator 2 on the engine shaft, for example. It is also desirable to employ the configuration of this embodiment for construction machinery having a configuration preferentially determining the assist power of the motor generator 2 by separate control in order to avoid the engine stall caused by insufficient power.

Figure 17:
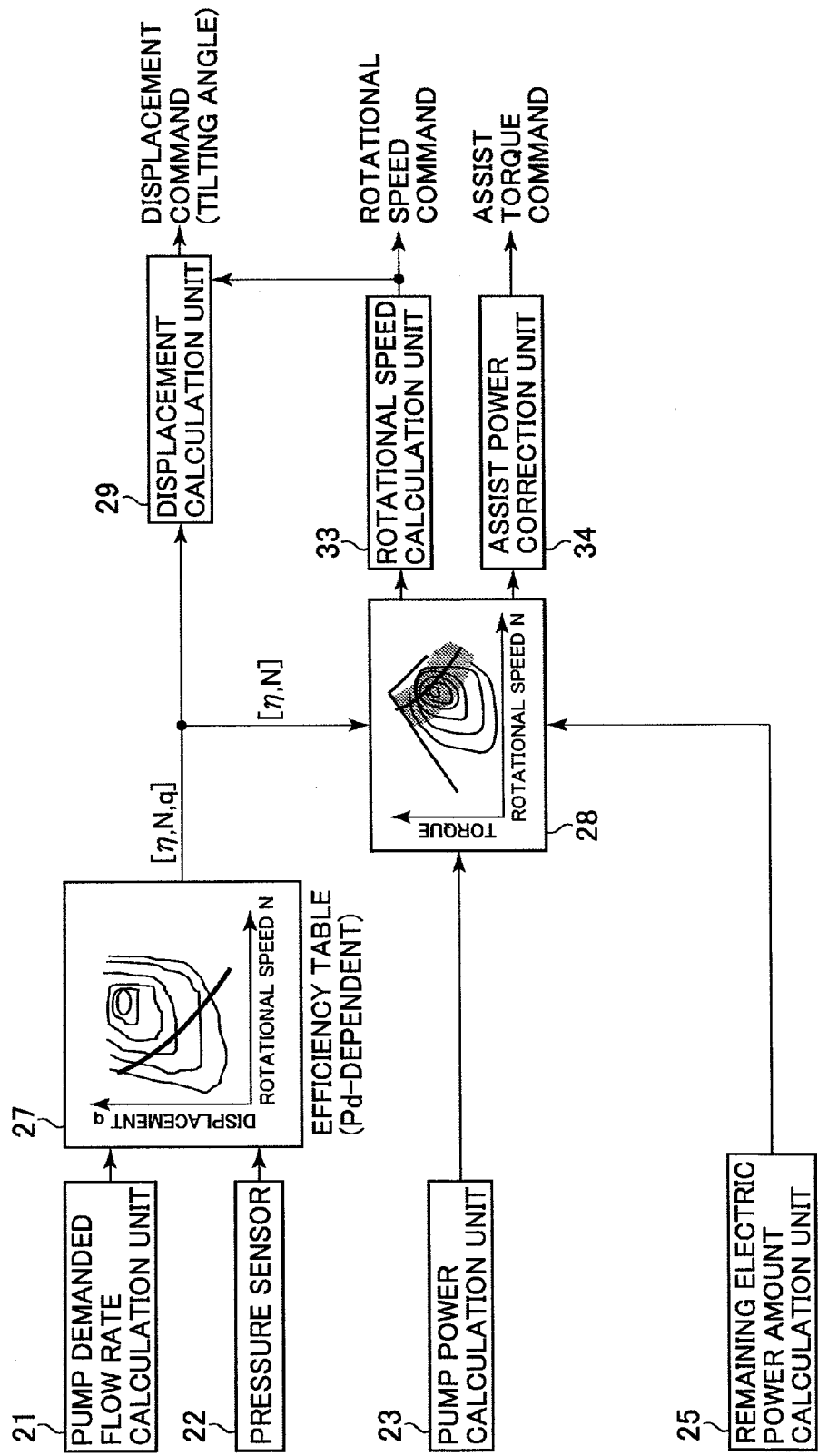
FIG. 17 is a schematic diagram showing the overall configuration of a controller according to a fourth embodiment of the present invention.
Figure 18:
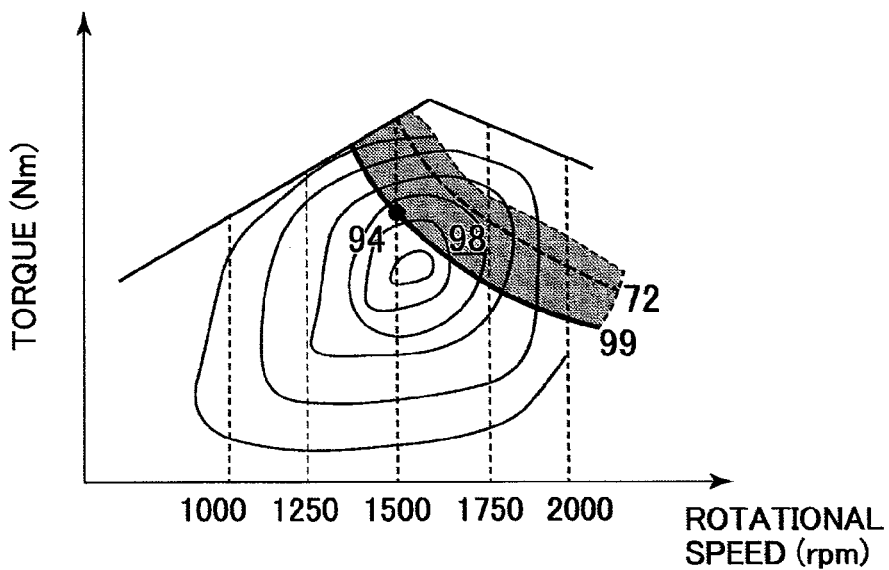
FIG. 18 is a schematic diagram showing a system efficiency map generated by a first operating point calculation unit 28 according to the fourth embodiment of the present invention.
Figure 19:
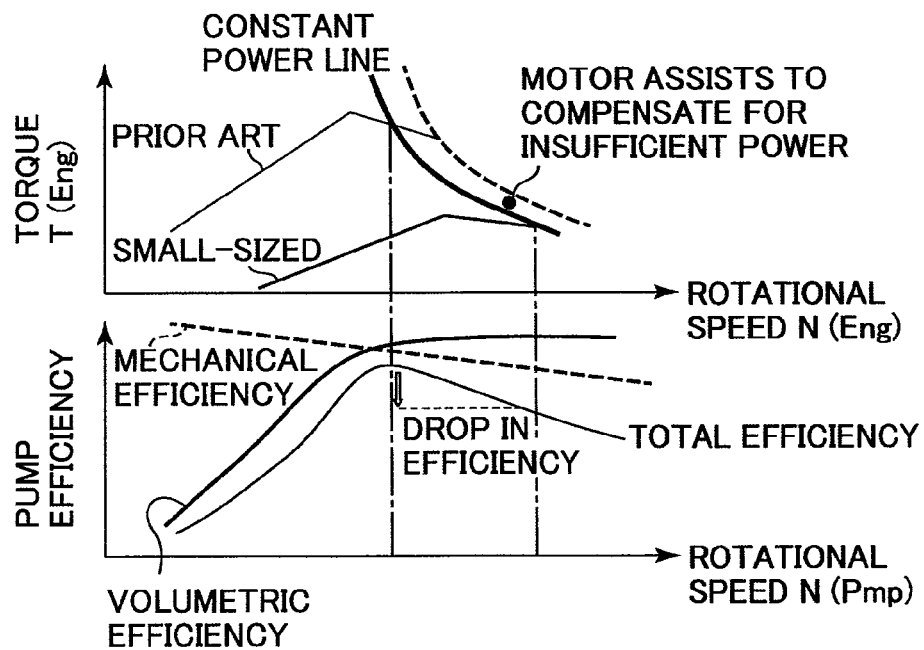
FIG. 19 is a schematic diagram showing the change in pump efficiency with respect to the rotational speed in a case where the pump displacement is kept constant.

FIG. 17 is a schematic diagram showing the overall configuration of a controller according to a fourth embodiment of the present invention. The controller shown in FIG. 17 is for a hybrid hydraulic excavator equipped with the motor generator 2 and the electrical storage device 10. This controller corresponds to a configuration obtained by leaving out the assist power calculation unit 24 and the engine demanded power calculation unit 26 from the configuration shown in FIG. 3. In this embodiment, the constant power line 72 of the pump power calculated by the pump power calculation unit 23 is drawn on the system efficiency map, an operable region (hatched region) 98 of the motor generator 2 is designated based on the constant power line 72 and the remaining electric power amount calculated by the remaining electric power amount calculation unit 25, and an operating point achieving the desired system efficiency is selected from the operating points in the hatched region 98. FIG. 18 is a schematic diagram showing the system efficiency map generated by the system operating point calculation unit 28. In the case of FIG. 18, the operating point achieving the best system efficiency in the hatched region 98 is the point 94 and the target rotational speed of the engine 1 can be calculated as 1500 rpm. Further, the magnitude of the assist power that should be generated by the motor generator 2 in this case (assist torque command) can be determined from the difference between the constant power line 99 passing through the operating point 94 and the constant power line 72 of the pump power. The torque control of the motor generator 2 in this embodiment is performed by the feed forward control since the controller in this embodiment does not include the assist power calculation unit 24.

Incidentally, while cases where the combinations of engine rotational speed, engine torque and system efficiency, etc. are calculated in the table format have been explained in the above embodiments, it is also possible to functionalize the above-described processes and calculate the combinations based on the function (mathematical function) obtained by the functionalization. While the calculation processes according to the above embodiments are executed by mainly using power (product of rotational speed and torque) in the above explanation, the calculation processes may also be executed based on calculations using torque.

DESCRIPTION OF REFERENCE CHARACTERS 1 engine
2 motor generator
3 hydraulic pump
5 hydraulic actuator
9 inverter
10 electrical storage device
14 regulator
15 electromagnetic proportional valve
16 operating lever
17 engine control dial
18a, 18b pressure sensor
21 pump demanded flow rate calculation unit
22 pressure sensor
23 pump power calculation unit
23A pump demanded power calculation unit
24 assist power calculation unit
25 remaining electric power amount calculation unit
26 engine demanded power calculation unit
27 pump operating point calculation unit (second operating point calculation unit)
28 system operating point calculation unit (first operating point calculation unit)
29 displacement calculation unit
32 pilot pump
33 rotational speed calculation unit
34 assist power correction unit

The invention claimed is:

1. A control device for construction machinery equipped with an engine and a variable displacement hydraulic pump driven by the engine, comprising:
a control device configured to calculate target rotational speed of the engine and target displacement of the hydraulic pump on the basis of demanded flow rate of the hydraulic pump corresponding to engine rotational speed, discharge pressure of the hydraulic pump and operation amounts of operating levers,
wherein the control device
calculates a plurality of pump operating points, each of the plurality of pump operating points being defined by a combination of a pump rotational speed and a pump displacement at which the demanded flow rate of the hydraulic pump can be generated,
calculates pump efficiencies at the plurality of the pump operating points on the basis of a pump efficiency map corresponding to the discharge pressure of the hydraulic pump,
calculates a plurality of engine operating points, the plurality of engine operating points defined by a combination of a rotational speed of the engine and a torque of the engine at which the demanded power of the engine corresponds to the demanded flow rate of the hydraulic pump,
calculates engine efficiencies at the plurality of the engine operating points on the basis of an engine efficiency map,
calculates system efficiencies at the plurality of the engine operating points by multiplying each of the pump efficiencies by each of the engine efficiencies, respectively,
selects an engine operating point with a highest system efficiency of the system efficiencies calculated at the plurality of the engine operating points,
calculates a rotational speed of the engine at the selected engine operating point as the target rotational speed of the engine, and
calculates the target displacement of the hydraulic pump on the basis of the target rotational speed of the engine and the demanded flow rate of the hydraulic pump.

2. The control device for construction machinery according to claim 1, wherein:
the construction machinery is further equipped with a motor generator which assists the driving of the hydraulic pump by the engine or generates electric power by being driven by the engine, and
the control device uses power calculated by subtracting power generated by the motor generator from demanded power of the hydraulic pump as the demanded power of the engine.

3. The control device for construction machinery according to claim 2, wherein:
the construction machinery is further equipped with an electrical storage device for storing electric power for driving the motor generator, and the control device further calculates the power generated by the motor generator based on a remaining electric power amount of the electrical storage device.

4. The control device for construction machinery according to claim 3, wherein the control device executes a process of calculating the power generated by the motor generator based exclusively on the remaining electric power amount or a process of calculating the power generated by the motor generator based on the difference between the remaining electric power amount and a target remaining electric power amount.

5. The control device for construction machinery according to claim 2, the control device corrects the power generated by the motor generator such that the engine operating point whose system efficiency is highest in the system efficiencies is calculated.

6. The control device for construction machinery according to claim 1, wherein the pump efficiency map has axes representing the pump rotational speed and the pump displacement, and wherein the pump efficiencies at the plurality of pump operating points correspond to points along a constant flow rate line intersecting contour lines of each combination of rotational speed and displacement.

7. The control device for construction machinery according to claim 1, wherein the engine efficiency map is represented by a curve of optimum fuel efficiency of the engine for a plurality of rotational speeds at the time of fixed power.

* * * * *